US011214647B2

(12) United States Patent
Zhang et al.

(10) Patent No.: US 11,214,647 B2
(45) Date of Patent: Jan. 4, 2022

(54) PROCESS FOR PRODUCING A LOW DENSITY FREE-RISE POLYURETHANE FOAM

(71) Applicant: PROPRIETECT L.P., Toronto (CA)

(72) Inventors: Jing Zhang, Toronto (CA); Dorota Ulman, Brampton (CA)

(73) Assignee: PROPRIETECT L.P.

( * ) Notice: Subject to any disclaimer, the term of this patent is extended or adjusted under 35 U.S.C. 154(b) by 0 days.

(21) Appl. No.: 16/397,373

(22) Filed: Apr. 29, 2019

(65) Prior Publication Data

US 2019/0248948 A1    Aug. 15, 2019

Related U.S. Application Data

(63) Continuation of application No. 14/434,247, filed as application No. PCT/CA2013/000855 on Oct. 10, 2013, now abandoned.

(60) Provisional application No. 61/795,075, filed on Oct. 10, 2012.

(51) Int. Cl.
| | |
|---|---|
| C08G 18/48 | (2006.01) |
| C08G 18/08 | (2006.01) |
| C08G 18/66 | (2006.01) |
| C08G 18/76 | (2006.01) |
| C08G 18/18 | (2006.01) |
| C08G 18/20 | (2006.01) |

(52) U.S. Cl.
CPC ......... *C08G 18/14* (2013.01); *C08G 18/1825* (2013.01); *C08G 18/1833* (2013.01); *C08G 18/2063* (2013.01); *C08G 18/4883* (2013.01); *C08G 18/6677* (2013.01); *C08G 18/7621* (2013.01); *C08G 18/7664* (2013.01); *C08G 18/7671* (2013.01); *C08G 2110/005* (2021.01); *C08G 2110/0008* (2021.01); *C08G 2110/0083* (2021.01)

(58) Field of Classification Search
CPC ............. C08G 18/14; C08G 18/1833; C08G 18/4883; C08G 18/1825; C08G 18/7671; C08G 18/2063; C08G 18/7621; C08G 18/7664; C08G 18/6677; C08G 2101/0083; C08G 2101/005; C08G 2101/0008

See application file for complete search history.

(56) References Cited

U.S. PATENT DOCUMENTS

| | | | |
|---|---|---|---|
| 6,068,790 A | 5/2000 | Postema et al. | |
| 6,201,035 B1 | 3/2001 | Tuinman et al. | |
| 2011/0166244 A1* | 7/2011 | Mortelmans | ....... C08G 18/4072 521/137 |
| 2012/0071576 A1 | 3/2012 | Burdeniuc et al. | |
| 2012/0202908 A1* | 8/2012 | Sasaki | ................ C08G 18/4812 521/174 |
| 2012/0238656 A1* | 9/2012 | De Kesel | ................ C08L 75/04 521/137 |
| 2012/0252916 A1* | 10/2012 | Sasaki | ................ C08G 65/2663 521/123 |
| 2012/0259029 A1 | 10/2012 | Stegt | |

FOREIGN PATENT DOCUMENTS

| | | |
|---|---|---|
| CN | 101410430 A | 4/2009 |
| WO | 2011081793 A1 | 7/2011 |
| WO | 2014056080 A2 | 4/2014 |

OTHER PUBLICATIONS

Ashish Aneja, "Structure-Property Relationships of Flexible Polyurethane Foams. Virginia",Polytechnic Institute and State University [online] May 5, 2004 and December 4, 2008, Retrieved from Internet <URL http/ /scholar.lib. vt edu/theses/m ailable/etd-12032002-1 70009/umestricted/03 Chapter 2.pdt>.

Brazil Office Action dated Nov. 12, 2019, from Brazil Application No. BR112015008003-0, 4 sheets.

Aneja A., "Structure-Property Relationships of Flexible Polyurethane Foams", Virginia Polytechnic Institute and State University [online] (May 5, 2004), URL:http://scholar.lib.vt.edu/theses/available/etd-12032002-170009/unrestricted/03_Chapter_2.pdf, 39 sheets.

\* cited by examiner

*Primary Examiner* — John M Cooney
(74) *Attorney, Agent, or Firm* — Katten Muchin Rosenman LLP

(57) ABSTRACT

There is described a process for producing a free-rise polyurethane foam having a density of less than or equal to about 0.75 pcf. the process comprises the steps of: (a) contacting: (i) an isocyanate, (ii) a first polyol comprising a first polymer chain consisting essentially of propylene oxide units and alkylene oxide units selected from ethylene oxide, butylene oxide and mixtures thereof in a weight ratio of propylene oxide units to alkylene oxide units in the range of from about 90:10 to about 25:75, the polymer chain being terminally capped with the ethylene oxide units, the first polyol having a primary hydroxyl content of at least about 70% based on the total hydroxyl content of the first polyol, (iii) water (iv) a surfactant and (v) a catalyst to form a foamable reaction mixture; and (b) expanding the foamable reaction mixture to produce the free-rise polyurethane foam.

5 Claims, No Drawings

PROCESS FOR PRODUCING A LOW DENSITY FREE-RISE POLYURETHANE FOAM

CROSS-REFERENCE TO RELATED APPLICATION

This application is a continuation of U.S. patent application Ser. No. 14/434,247, filed Apr. 8, 2015, which claims the benefit under 35 U.S.C. § 119(e) of provisional patent application Ser. No. 61/795,075, filed Oct. 10, 2012, the contents of all which are hereby incorporated by reference.

BACKGROUND OF THE INVENTION

Field of the Invention

In one of its aspects, the present invention relates to a process for producing a free-rise polyurethane foam having a density of less than or equal to about 0.75 pcf. In another of its aspects, the present invention relates to a free-rise flexible polyurethane foam produced by this process. In yet another of its aspects, the present invention relates to a free-rise flexible polyurethane foam: (i) having a density less than or equal to about 0.75 pcf, (ii) having a low exotherm during production, and (iii) being substantially completely free of metal-containing catalyst

Description of the Prior Art

Isocyanate-based polymers are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in the ability to mold the polymer while it is forming and expanding.

One of the conventional ways to produce a polyurethane foam is known as the "one-shot" technique. In this technique, the isocyanate, a suitable polyol, a catalyst, water (which acts as a reactive "blowing" agent and can optionally be supplemented with one or more physical blowing agents) and other additives are mixed together at once using, for example, impingement mixing (e.g., high pressure). Generally, if one were to produce a polyurea, the polyol would be replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixing technique.

There are two main reactions in the production of polyurethane foam which need to be kept in proper balance to achieve desired product. These reactions are: the blow reaction and the gelation reaction. If the blowing reaction occurs too quickly, the resulting growing foam does not have enough strength and collapses. If the gel reaction occurs too quickly, the resulting foam will shrink during cooling. Polyurethane foams therefore require a very balanced formulation. The two reactions—blowing and gelling—happening simultaneously need to be balanced more carefully when it is desired to produce a relatively low density foam.

Another technique for producing foamed isocyanate-based polymers is known as the "prepolymer" technique. In this technique, a prepolymer is produced by reacting a polyol and an isocyanate wherein one of those components is in excess, in an inert atmosphere to form a liquid prepolymer terminated with reactive groups (e.g., isocyanate moieties if the isocyanate is in excess or active hydrogen moieties if polyol is in excess). To produce the foamed polymer, the prepolymer is thoroughly mixed with other components.

It is known in the art to produce polyurethane foam in the form of molded foam and slabstock foam.

Molded foam is typically used in vehicular seating applications and is made by dispensing into an open mold a foam composition. The mold is then closed to define mold cavity which shapes the expanding foam composition on all sides/surfaces.

Given that molded polyurethane foams are relatively smaller in size and the cycle time for the molding operation is relatively short, it is conventional to utilize polyols having a relatively high reactivity. This allows for the reaction to proceed at an appropriate rate. These so-called "molded polyols" (described in more detail below in relation to the "first polyol") typically have a high content of primary hydroxyl groups. When producing molded polyurethane foams, it is conventional to heat the mold during foam production.

Slabstock polyurethane foam conventionally used in the production of automotive headliners or other non automotive applications is known as a foam (e.g., a resilient foam) having at least one uncontoured surface (i.e., the foam is a "free-rise" foam).

In a typical slab polyurethane foam production plant, the resultant foam is usually produced by dispensing a foamable composition into a trough having an open top (also known as a tunnel) and a conveyor bottom to move the composition away from the mixhead as the foam rises. Low pressure mixing is typically used and involves metering the components for loam production into a mixhead equipped with a stirrer (or other suitable agitation means) at a pressure generally less than 50 psi (usually 2-15 psi). The components are mixed in the mixhead and the foamable composition is expanded to produce polyurethane foam. As is known in the art, low pressure mixing is conventionally used to produce slabstock foam. It is known to vary the properties of the resulting foam by varying the nature and/or amount of one or more of the metered components.

Commercial slabstock polyurethane foam plants produce foam "buns" having dimensions such as up to 4 feet or more (height)×up to 6 feet (width) or more×up to 100 feet (length) or more. Each bun is then cut into parts of shape and dimension applicable to the intended use of the foam. For example, if the foam is used to produce an automotive headliner, a plurality of shorter length (e.g., 5 feet) buns are cut, depending on the specifications of the particular automotive headliner being produced. The shorter length bun is then sliced into sheets of appropriate thickness (e.g., ⅛ to ½ inches). Each sheet is then used as a component of sandwich headliner composite, which is trimmed and secured in the automobile. It is also known in the art to subject each sheet along with other components to further processing steps such as thermoforming so to confer to the planar sheet a slightly contoured appearance which more closely assumes the shape of the roof of the automobile. If the foam is being used as packaging material, sponge, mattress, cushions etc it is cut into appropriate pieces for that application. Polyurethane foams can also be produced in discontinuous way known as box pour.

Given the large size of the product produced in a slabstock foam plant, it is conventional to utilize polyols that have a relatively low reactivity. This allows for the reaction to proceed at an appropriate rate. These so-called "slabstock polyols" (described in more detail below in relation to the "second polyol") typically have a high content of secondary hydroxyl groups. Given the lower reactivity of slabstock-polyols (compared to molded polyols), it has been conventional to use metal (e.g., tin) catalysts along with amine catalysts during the production of slabstock foams.

Not surprisingly, when producing slabstock foam, the exotherm of the foam is a significant safety concern. As is known in the art, the reactions between isocyanate and polyol and between isocyanate and water (i.e., when producing a polyurethane foam) are exothermic liberating a significantly large amount of heat. While the exotherm in a molded foam is manageable because the size of the molded foam product is relatively small, so the dissipation of the heat of the reaction is fast (in fact, as stated above, it is conventional to heat the mold during foam production), the exotherm in slabstock foam must be specifically addressed since the product is so large.

As used throughout this specification, the term "exotherm", when used in the context of a polyurethane foam, is intended to mean heat of reaction experienced by the foam during production. Thus, the term, "maximum exotherm" is intended to mean the maximum heat of reaction experienced by the foam during production—practically, this may be assessed by measuring the maximum temperature reached by the foam bun (typically in the area of the core) directly after production. In practice, once a threshold temperature is reached (typically up to 160° C. for most open cell flexible slabstock foams and up to 200° C. for most rigid, semi-rigid and low airflow slabstock foams), in the presence of air or oxygen, auto-oxidation of the foam may occur resulting in discoloration (product deterioration) and sometimes fire (damaging and/or destroying the manufacturing facility).

It has not been conventional to utilize molded polyols in the production of slabstock foams because such use can aggravate the exotherm problem described above. Specifically, due to the relatively high reactivity of the molded polyols, there is a greater risk of increasing the exotherm of the reaction and contributing to the occurrence of the problems mentioned above.

Typically, slabstock (or free-rise) foams can be produced on a commercial scale with a density as low as about 1.3 pcf without the danger of catching the fire. For densities below 1.3 pcf, it has been conventional to use the auxiliary blowing agents in the form of gas ($CO_2$) or low boiling point liquids (e.g., methylene chloride and the like). These auxiliary blowing agents do not generate extra heat but lower density further by expanding (gas) or evaporating from the system (liquid). Low boiling point liquids have capacity to even lower exothermic temperature. These auxiliary blowing agents (particularly low boiling point liquids) are not friendly to the environment and their use increases the cost of foam production. Foam production with auxiliary blowing agents is also more difficult and in some cases requires higher capital investment.

There is an ongoing need to be able to produce a low density (i.e, less than or equal to about 0.75 pcf) slabstock flexible polyurethane foam having a low exotherm during production and preferably in the absence of metal catalysts and/or auxiliary blowing agents.

SUMMARY OF THE INVENTION

It is an object of the present invention to obviate or mitigate at least one of the above-mentioned disadvantages of the prior art.

It is another object of the present invention to provide a novel process to produce a free-rise polyurethane foam having a density of less than or equal to about 0.75 pcf.

It is yet another object of the present invention to provide a novel free-rise polyurethane foam having a density of less than or equal to about 0.75 pcf.

Accordingly, in one of its aspects, the present invention provides a process for producing a free-rise polyurethane foam having a density of less than or equal to about 0.75 pcf, the process comprising the steps of:

(a) contacting: (i) an isocyanate, (ii) a first polyol comprising a first polymer chain consisting essentially of propylene oxide units and alkylene oxide units selected from ethylene oxide, butylene oxide and mixtures thereof in a weight ratio of propylene oxide units to alkylene oxide units in the range of from about 90:10 to about 25:75, the polymer chain being terminally capped with the ethylene oxide units, the first polyol having a primary hydroxyl content of at least about 70% based on the total hydroxyl content of the first polyol, (iii) water (iv) a surfactant and (v) a catalyst to form a foamable reaction mixture; and (b) expanding the foamable reaction mixture to produce the free-rise polyurethane foam.

In another of its aspects, the present invention provides a free-rise flexible polyurethane foam: (i) having a density less than or equal to about 0.75 pcf, (ii) having a low exotherm during production, and (iii) being substantially completely free of metal (e.g, tin) catalyst.

Thus, the present inventors have discovered a novel approach to the production of a free-rise flexible polyurethane foam having a density less than or equal to about 0.75 pcf. Specifically, the present inventors have discovered an approach which allows for the production of a free-rise flexible polyurethane foam having a density less than or equal to about 0.75 pcf using so-called molded polyols while maintaining a relatively low exotherm during production. Advantageously, this can be achieved while avoiding the use of auxiliary (e.g, hydrocarbon) blowing agents and/or tin-based catalyst compounds. While not wishing to be bound by any particular theory or mode of action, it is believed that through the use of molded polyols in the production of a free-rise polyurethane foam would be expected to increase the exotherm of the foam, this increase in exotherm can be managed and/or offset by adding more water than stoichiometrically required to the foam formulation. It is believed that the ability to add more water allows for absorption of exotherm generated by the use of molded polyols while concurrently generating more carbon dioxide in situ (blowing agent) thereby producing a lower density foam while obviating and/or mitigated shrinkage or collapse of the foam.

DETAILED DESCRIPTION OF THE PREFERRED EMBODIMENTS

The present process comprises: (a) contacting: (i) an isocyanate. (ii) a first polyol comprising a first polymer chain consisting essentially of propylene oxide units and alkylene oxide units selected from ethylene oxide, butylene oxide and mixtures thereof in a weight ratio of propylene oxide units to alkylene oxide units in the range of from about 90:10 to about 25:75, the polymer chain being terminally capped with the ethylene oxide units, the first polyol having a primary hydroxyl content of at least about 70% based on the total hydroxyl content of the first polyol, (iii) water, (iv) surfactant and (v) a catalyst to form a foamable reaction mixture; and expanding the foamable reaction mixture to produce the free-rise polyurethane foam.

Preferred embodiments of this embodiment of the present invention may include any one or a combination of any two or more any of the following features:

- the alkylene oxide units in the first polyol consist of ethylene oxide;
- the weight ratio of propylene oxide units to alkylene oxide units in the first polyol is from about 90:10 to about 70:30;
- the weight ratio of propylene oxide units to alkylene oxide units in the first polyol is from about 90:10 to about 80:20;
- the weight ratio of propylene oxide units to alkylene oxide units in the first polyol is from about 90:10 to about 85:15;
- the primary hydroxyl content in the first polyol is at least about 75% based on the total hydroxyl content of the first polyol;
- the primary hydroxyl content in the first polyol is in the range of from about 75% to about 95% based on the total hydroxyl content of the first polyol;
- the primary hydroxyl content in the first polyol is in the range of from about 80% to about 95% based on the total hydroxyl content of the first polyol;
- the primary hydroxyl content in the first polyol is in the range of from about 80% to about 90% based on the total hydroxyl content of the first polyol;
- the first polyol has a molecular weight of at least about 2500;
- the first polyol has a molecular weight in the range of from about 2,500 to about 20,000;
- the first polyol has a molecular weight in the range of from about 2,500 to about 17,500;
- the first polyol has a molecular weight in the range of from about 2,500 to about 15,000;
- the first polyol has a molecular weight in the range of from about 2,800 to about 12,000;
- the first polyol has a molecular weight in the range of from about 4,000 to about 8,000;
- a second polyol is included in the reaction mixture, the second polyol comprising a second polymer chain consisting essentially of propylene oxide units and alkylene oxide units selected from ethylene oxide, butylene oxide and mixtures thereof in a weight ratio of propylene oxide units to alkylene oxide units in the range of from about 95:5 to about 60:40, the polymer chain being terminally capped with the alkylene oxide units, the second polyol having a secondary hydroxyl content of at least about 70% based on the total hydroxyl content of the second polyol;
- the second polyol is present up to 40 weight percent of the total polyol content in the reaction mixture;
- the second polyol is present up to 35 weight percent of the total polyol content in the reaction mixture;
- the second polyol is present up to 30 weight percent of the total polyol content in the reaction mixture;
- the second polyol is present up to 25 weight percent of the total polyol content in the reaction mixture;
- the second polymer is present up to 20 weight percent of the total polyol content in the reaction mixture;
- the OH functionality for polyol content in the reaction mixture is in the range of from about 2 to about 4.
- water is used in an amount of at least about 10 parts by weight per 100 parts by weight polyol in the reaction mixture;
- water is used in an amount in the range of from about 10 parts by weight to about 35 parts by weight per 100 parts by weight polyol in the reaction mixture;
- water is used in an amount in the range of from about 15 parts by weight to about 30 parts by weight per 100 parts by weight polyol in the reaction mixture;
- water is used in an amount in the range of from about 17 parts by weight to about 35 parts by weight per 100 parts by weight polyol in the reaction mixture;
- the reaction mixture is substantially completely free of added $CO_2$;
- the reaction mixture is substantially completely free of added organic blowing agents;
- the catalyst is an amine catalyst;
- the catalyst is used in an amount of up to about 1 part by weight per 100 parts by weight polyol in the reaction mixture;
- the catalyst is used in an amount in the range of from about 0.05 parts by weight to about 0.5 parts by weight per 100 parts by weight polyol in the reaction mixture;
- the catalyst is used in an amount in the range of from about 0.15 parts by weight to about 0.4 parts by weight per 100 parts by weight polyol in the reaction mixture;
- the catalyst is used in an amount in the range of from about 0.25 parts by weight to about 0.35 parts by weight per 100 parts by weight polyol in the reaction mixture;
- the isocyanate is used in an amount to provide an isocyanate index less than or equal to about 100;
- the isocyanate is used in an amount to provide an isocyanate index in the range of from about 45 to about 75;
- the isocyanate is used in an amount to provide an isocyanate index in the range of from about 45 to about 65;
- the isocyanate is used in an amount to provide an isocyanate index in the range of from about 50 to about 55;
- the reaction mixture further comprises a surfactant;
- the surfactant is used in an amount of up to about 5 parts by weight per 100 parts by weight polyol in the reaction mixture;
- the surfactant is used in an amount of up to about 4 parts by weight per 100 parts by weight polyol in the reaction mixture;
- the surfactant is used in an amount in the range from about 0.5 parts by weight to about 3 parts by weight per 100 parts by weight polyol in the reaction mixture;
- the surfactant is used in an amount in the range from about 1.2 parts by weight to about 1.5 parts by weight per 100 parts by weight polyol in the reaction mixture;
- the free-rise polyurethane foam has a density of in the range of from about 0.30 pcf to about 0.75 pcf;
- the free-rise polyurethane foam has a density of in the range of from about 0.30 pcf to about 0.80 pcf;
- the free-rise polyurethane foam has a density of in the range of from about 0.30 pcf to about 0.70 pcf;
- the free-rise polyurethane foam has a density of in the range of from about 0.40 pcf to about 0.60 pcf; and/or
- the free-rise polyurethane foam has a density of about 0.50 pcf.

In another of its aspects, the present invention provides a free-rise flexible polyurethane foam: (i) having a density less than or equal to about 0.75 pcf, (ii) having a low exotherm during production, and (iii) being substantially completely free of metal (e.g, tin) catalyst.

Preferred embodiments of this embodiment of the present invention may include any one or a combination of any two or more any of the following features:

the density is less than about 0.75 pcf;
the density is in the range from about 0.50 pcf to about 0.75 pcf;
the density is in the range from about 0.50 pcf to about 0.65 pcf; and/or
the foam is substantially completely free of a tin catalyst.

The isocyanate suitable for use in the reaction mixture is not particularly restricted and the choice thereof is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1\text{-Z-}Q^1$$

wherein $Q^1$ is an alkylene or arylene group and Z is chosen from the group comprising —O—, —O-$Q^1$-, —CO—, —S—, —S-$Q^1$-S—, —SO$_2$— and -Q-N=C=N-Q-. Examples of isocyanate compounds which fall within the scope of this definition include hexamethylenediisocyanate, 1,8-diisocyanato-p-methane, xylyldiisocyanate, (OCNCH$_2$CH$_2$CH$_2$OCH$_2$O)$_2$, 1-methyl-2,4-diisocyanato-cyclo-hexane, phenylenediisocyanates, tolylenediisocyanates, chlorophenylenediisocyanates, diphenylmethane-4,4'-diisocyanate, naphthalene-1,5-diisocyanate, triphenyl-methane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

$$Q'[(NCO)_i]_j$$

wherein both i and j are integers having a value of 2 or more, and Q' is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonicdiisocyanate, phenylphosphonicdiisocyanate, compounds which contain a —Si—NCO group, isocyanate compounds derived from sulphonamides (QSO$_2$NCO), cyanic acid and thiocyanic acid.

See also for example, British patent number 1,453,258, for a discussion of suitable isocyanates.

Non-limiting examples of suitable isocyanates include: 1,6-hexamethylene diisocyanate, 1,4-butylene diisocyanate, furfurylidenediisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, carbodiimide modified 4,4'-diphenylmethanediisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylenediisocyanate, m-phenylenediisocyanate, 1,4-naphthalene diisocyanate, dianisidinediisocyanate, bitolylenediisocyanate, 1,4-xylylene diisocyanate, 1,3-xylylene diisocyanate, bis-(4-isocyanatophenyl)methane, bis-(3-methyl-4-isocyanatophenyl)methane, polymethylenepolyphenylpolyisocyanates and mixtures thereof. A more preferred isocyanate is selected from the group comprising 2,4'-diphenylmethane diisocyanate, 4,4'-diphenylmethane diisocyanate and mixtures thereof as well as polymeric MDI which is also known as crude MDI. Another more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate.

The reaction mixture used to produce the present polyurethane foam comprises a first polyol comprising a first polymer chain consisting essentially of propylene oxide units and alkylene oxide units selected from ethylene oxide, butylene oxide and mixtures thereof in a weight ratio of propylene oxide units to alkylene oxide units in the range of from about 90:10 to about 25:75, the polymer chain being terminally capped with the ethylene oxide units, the first polyol having a primary hydroxyl content of at least about 70% based on the total hydroxyl content of the first polyol. These features of the first polyol are typical for polyols normally used to produce molded foam.

The first polyol can be used alone or in combination with a second polyol comprising a second polymer chain consisting essentially of propylene oxide units and alkylene oxide units selected from ethylene oxide, butylene oxide and mixtures thereof in a weight ratio of propylene oxide units to alkylene oxide units in the range of from about 100:0 to about 60:40, the polymer chain being terminally capped with the alkylene oxide units, the second polyol having a secondary hydroxyl content of at least about 95% based on the total hydroxyl content of the second polyol. These features of the second polyol are typical for polyols normally used to produce slab (free rise) foam.

Within these definitions for the first polyol and the second polyol, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneethertriols. More preferred polyols are selected from the group comprising adipic acid-ethylene glycol polyester, poly(butylene glycol), poly(propylene glycol) and hydroxyl-terminated polybutadiene—see, for example, British patent number 1,482,213, for a discussion of suitable polyols. Preferably, such a polyether polyol has a molecular weight in the range of from about 100 to about 10,000, more preferably from about 100 to about 4,000, most preferably from about 100 to about 3,500.

In another embodiment, the second polyol may comprise a polymer polyol, also known as graft copolymer polyols. As is known in the art, such polyols are generally polyether polyol dispersions which are filled with other organic polymers. Such polymer polyols are useful in load building or improving the hardness of the foam when compared to using unmodified polyols. Non-limiting examples of useful polymer polyols include: chain-growth copolymer polyols (e.g., containing particulate poly(acrylonitrile), poly(styrene-acrylonitrile) and mixtures thereof), and/or step-growth copolymer polyols (e.g., PolyHarnstoff Dispersions (PHD), polyisocyanatepolyaddition (PIPA) polyols, epoxy dispersion polyols and mixtures thereof). For further information on polymer polyols, see, for example, Chapter 2 of FLEXIBLE FOAM FUNDAMENTALS, Herrington et al. (1991) and the references cited therein. If a polymer polyol is used, it is preferred to mix the polymer polyol with a base polyol. Generally, mixtures may be used which contain polymer polyol in an amount in the range of from about 5 to about 50 percent by weight of unmodified polyol present in the mixture.

The second polyol may also be a so-called bio-based polyol. As used throughout this specification, the term "bio-based polyols" is a generic term intended to encompass polyols derived from renewable resources such as a vegetable oil or another bio-originated material.

The preferred bio-based polyol is a vegetable oil-based polyol. Non-limiting examples of suitable vegetable oils from which such a polyols may be derived include soybean oil, safflower oil, linseed oil, corn oil, sunflower oil, olive oil, canola oil, sesame oil, cottonseed oil, palm oil, rapeseed oil, tung oil, fish oil, peanut oil and combinations thereof. Also useful are partially hydrogenated vegetable oils and genetically modified vegetable oils, including high oleic safflower oil, high oleic soybean oil, high oleic peanut oil, high oleic sunflower oil and high erucic rapeseed oil (crambe oil).

A suitable method to prepare the bio-based (e.g., vegetable oil-based) polyol involves reacting the vegetable oil (or mixture of vegetable oils) with a peroxyacid, providing an epoxidized vegetable oil. Essentially, some or all of the double bonds of the vegetable oil may be epoxidized. The epoxidized vegetable oil may be further reacted with an alcohol, a catalytic amount of fluoroboric acid and, optionally, water to form the polyol. Such polyols contain all secondary hydroxyl groups.

These bio-based polyols may be used directly in a reaction mixture to produce an isocyanate-based foam such as a polyurethane foam. Alternatively, the bio-based polyols may be reacted with the epoxidized vegetable oils described above in the presence of a fluoroboric acid catalyst and, optionally, water to form a bio-based polyol suitable for use in a reaction mixture to produce an isocyanate-based foam such as a polyurethane foam.

Examples of such preparations are described, for example, in one or more of

U.S. Pat. No. 6,686,435 [Petrovic et al.];
U.S. Pat. No. 6,107,433 [Petrovic et al.];
U.S. Pat. No. 6,573,354 [Petrovic et al.]; and
U.S. Pat. No. 6,433,121 [Petrovic et al.].

Alternatively, the epoxidation reaction may be conducted under conditions that result in a polyol having residual double bonds.

Also suitable are modified vegetable-oil based polyols prepared by a hydroformylation process. In this process, a vegetable oil is reacted with carbon monoxide and hydrogen in the presence of a Group VIII metal catalyst (e.g., a rhodium catalyst) to form a hydroformylated vegetable oil. The hydroformylated vegetable oil is then hydrogenated to form the modified vegetable oil-based polyol. This process produces polyols containing all primary hydroxyl groups. These polyols may be used directly in a reaction mixture to produce an isocyanate-based foam such as a polyurethane foam. Alternatively, they may be reacted with the epoxidized vegetable oils described above in the presence of a fluoroboric acid catalyst and, optionally, water to form a polyol suitable for use in a reaction mixture to produce an isocyanate-based foam such as a polyurethane foam.

A preferred bio-based polyol is described in international Publication Number WO 2008/106769 [Stanciu et al.].

In the present process, a catalyst is usually incorporated in the reaction mixture. The catalyst used in the reaction mixture is a compound capable of catalyzing the polymerization reaction and the blowing (foaming) reaction. Such catalysts are known, and the choice and concentration thereof in the reaction mixture is within the pure view of a person skilled in the art. See, for example, U.S. Pat. Nos. 4,296,213 and 4,518,778 for a discussion of suitable catalyst compounds. Non-limiting examples of suitable catalysts include tertiary amines and/or organometallic compounds. Additionally, as is known in the art, when the objective is to produce an isocyanurate, a Lewis acid must be used as the catalyst, either alone or in conjunction with other catalysts. Of course it will be understood by those skilled in the art that a combination of two or more catalysts may be suitably used. Preferably, the present process is conducted in the presence of one or more amine catalyst (reactive/non-fugitive or non-reactive/fugitive). More preferably, the present process is conducted in the absence of metal-containing (e.g., tin) catalyst.

The reaction mixture used to produce the polyurethane foam typically will further comprise a blowing agent. As is known in the art, water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). The preferred blowing agent for use in the production of the present foamed isocyanate-based polymer comprises water.

It is known in the art that the amount of water used as an indirect blowing agent in the preparation of a foamed isocyanate-based polymer (e.g., polyurethane) is conventionally in the range of from about 0.5 to as high as about 40 or more parts by weight, preferably from about 1.0 to about 10 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation, flame retardance and the like.

Embodiments of the present invention will now be described with reference to the following Examples which should not be construed as limiting the scope of the invention. The term "pbw" used in the Examples refers to parts by weight.

In the Examples the following compounds were used:
1. Polyol #1, a polyether polyol having an OH number of 39-35 functionality of 3.7-3.8 and a primary hydroxyl content of greater that 70%, commercially available from Bayer Corporation;
2. Polyol #2, a polyether polyol having an OH number of 56 and a secondary hydroxyl content of greater than 70%, commercially available from Bayer Corporation;
3. FR-38: Fyrol™ 38—flame retardant, commercially available from Supresta LLC;
4. Water, indirect blowing agent;
5. L-620: Niax™ silicone L-620 a silicone surfactant, commercially available from Momentive Performance Materials Holdings Inc.;
6. L-650: Niax™ silicone L-650—a silicone surfactant, commercially available from Momentive Performance Materials holdings Inc.;
7. B8229: Tecostab™ B8229—a surfactant/stabilizer, commercially available from Evonik Industries AG:
8. Glycerine—a crosslinker;
9. 33LV: Dabco™ 33LV—amine catalyst, commercially available from Air Products and Chemicals Inc.;
10. C-232: Niax™ C-232, amine catalyst, commercially available from Momentive Performance Materials Holdings Inc.;
11. A-1: Niax™ A-1, amine catalyst, commercially available from Momentive Performance Materials Holdings Inc.;
12. ZF-10: Jeffcat™ ZR-10, amine catalyst, commercially available from Huntsman Corporation;
13. ZR-50: Jeffcat™ ZR-50, amine catalyst, commercially available from Huntsman Corporation;
14. LED-204: Jeffcat™ LED-204—reactive, acid blocked, low emissions, low-corrosion type gelling catalyst, commercially available from Huntsman Corporation;
15. TDI: Isocyanate—T-80™, toluenediisocyanate, commercially available from Bayer Corporation or BASF AG;
16. MDI: Isocyanate—Polymeric MDI, polymethylenepolyphenylisocyanate, containing 4,4'-methylene bisphenylisocyanate with total NCO content 31.0-31.5%, commercially available from The Dow Chemical Company or Bayer Corporation.

Examples 1-2

In these Examples, foam samples were produced pursuant to the formulations provided in Table 1 (all parts are parts by weight). The methodology used in each Example was as follows.

A resin mixture was produced by mixing all ingredients except the isocyanate in a 1 L mixing vessel for a period of approximately 10 seconds at 3000 rpm. Next, the isocyanate was added to the mixing vessel and the contexts were mixed for a further 5 seconds. The contents of the mixing vessel were transferred to an open (15"×12"×12") and allowed to free rise, box The resulting foam was allowed to cure for at least 24 hours prior to testing.

Table 2 reports observations during production of the foam samples and properties of the resulting foams. These observations and properties illustrate that a good quality slab foam having very low density can be made using a high primary hydroxyl content polyol (normally used to produce molded foam) in the absence of added auxiliary blowing agents while maintaining low exotherm of the foam during production. The exotherm reported in Table 2 for the relatively small foam samples translates to an exotherm during production of a commercial size "bun" (described above) of approximately 155° C. which is acceptable from a safety viewpoint.

Example 3

The methodology of Examples 1 was repeated using the formulation provided in Table 3 (all parts are parts by weight).

Table 4 reports observations during production of the foam samples and properties of the resulting foam. The positive results seen in Example 1 were also seen in Example 2 even when a mixture of polyols (i.e., a high primary hydroxyl content polyol and a high secondary hydroxyl content polyol) was used with a reactive (non-fugitive) catalyst system.

Example 4

The methodology of Examples 1-2 was repeated using the formulation provided in Table 5 (all parts are parts by weight).

Table 6 reports observations during production of the foam samples and properties of the resulting foam. The positive results seen in Example 1 (re. low density) were also seen in Example 3 even when a mixture of polyols (i.e., a high primary hydroxyl content polyol and a high secondary hydroxyl content polyol), a mixture of isocyanates (i.e., TDI and MDI), a different surfactant and a different combination of catalysts.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 1

| Component | Sample A | Sample B |
|---|---|---|
| Polyol #1 | 100.00 | 100.0 |
| Glycerine | 0.25 | 0.25 |
| B8229 | 1.65 | — |
| L-620 | — | 1.65 |
| A-1 | 0.067 | 0.067 |
| 33-LV | 0.43 | 0.43 |
| FR-38 | 15.00 | 15.00 |
| Water | 17.30 | 17.30 |
| TDI | 95.00 | 95.00 |

TABLE 2

| | Example 1 | Example 2 |
|---|---|---|
| Cream time (sec) | 25 | 25 |
| Blow off (min) | 1'50" | 1'53" |
| Density (pcf) | 0.59 | 0.60 |
| Airflow (ft³/min) | 0.57 | 0.63 |
| CFD 50% (kpa) | 2.20 | 2.20 |
| Tensile (kpa) | 61.0 | 68.7 |
| Elongation (%) | 100.0 | 93.3 |

TABLE 2-continued

|  | Example 1 | Example 2 |
| --- | --- | --- |
| Tear strength (N/m) | 340.9 | 359.4 |
| Exotherm (° C.) | 135.0 | 135.0 |

TABLE 3

| Component | Amount |
| --- | --- |
| Polyol #1 | 87.50 |
| Polyol #2 | 12.50 |
| Glycerine | 0.50 |
| B8229 | 1.65 |
| ZR-50 | 0.20 |
| ZF-10 | 0.065 |
| FR-38 | 15.00 |
| Water | 17.30 |
| TDI | 100.00 |

TABLE 4

|  | Example 3 |
| --- | --- |
| Cream time (sec) | 26 |
| Blow off (min) | 1'45" |
| Density (pcf) | 0.50 |
| Airflow (ft³/min) | 1.50 |
| CFD 50% (kpa) | 4.30 |
| Tensile (kpa) | 61.0 |
| Elongation (%) | 72.0 |
| Tear strength (N/m) | 204.0 |
| Exotherm (° C.) | 135.0 |

TABLE 5

| Component | Amount |
| --- | --- |
| Polyol #1 | 30.00 |
| Polyol #2 | 70.00 |
| L-650 | 1.00 |
| LED-204 | 0.25 |
| ZR-50 | 0.25 |
| ZF-10 | 0.25 |
| FR-38 | 15.00 |
| Water | 20.00 |
| TDI | 46.00 |
| MDI | 69.00 |

TABLE 6

|  | Example 4 |
| --- | --- |
| Density (pcf) | 0.49 |
| Airflow (ft³/min) | 0.50 |
| CFD 50% (kpa) | 15.20 |
| Tensile (kpa) | 18.0 |
| Elongation (%) | 23.0 |

What is claimed is:

1. A process for producing a free-rise polyurethane foam having a density of less than or equal to about 0.75 pcf, the process comprising the steps of:

(a) contacting: (i) an isocyanate, (ii) a first polyol comprising a first polymer chain consisting essentially of propylene oxide units and alkylene oxide units selected from ethylene oxide, butylene oxide and mixtures thereof in a weight ratio of propylene oxide units to alkylene oxide units in the range of from about 90:10 to about 25:75, the polymer chain being terminally capped with the ethylene oxide units, the first polyol having a primary hydroxyl content of at least about 70% based on the total hydroxyl content of the first polyol, (iii) a second polyol is included in the reaction mixture, the second polyol comprising a second polymer chain consisting essentially of propylene oxide units and alkylene oxide units selected from ethylene oxide, butylene oxide and mixtures thereof in a weight ratio of propylene oxide units to alkylene oxide units in the range of from about 95:5 to about 60:40, the polymer chain being terminally capped with the alkylene oxide units, the second polyol having a secondary hydroxyl content of at least about 70% based on the total hydroxyl content of the second polyol, (iv) water, (v) a surfactant and (vi) a catalyst to form a foamable reaction mixture; and (b) expanding the foamable reaction mixture to produce the free-rise polyurethane foam.

2. The process defined in claim 1, wherein the second polyol is present up to 40 weight percent of the total polyol content in the reaction mixture.

3. The process defined in claim 1, wherein the second polymer is present up to 20 weight percent of the total polyol content in the reaction mixture.

4. The process defined in claim 1, wherein OH functionality for polyol content in the reaction mixture is in the range of from about 2 to about 4.

5. The process defined in claim 1, wherein water is used in an amount of at least about 10 parts by weight per 100 parts by weight polyol in the reaction mixture.

* * * * *